(12) United States Patent
Hori et al.

(10) Patent No.: US 12,524,488 B2
(45) Date of Patent: Jan. 13, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Takashige Hori, Aisai (JP); Naohiro Yoshimura, Nagoya (JP); Kazuya Fukagawa, Nagoya (JP); Naoto Yazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/932,888

(22) Filed: Oct. 31, 2024

(65) Prior Publication Data

US 2025/0252145 A1 Aug. 7, 2025

(30) Foreign Application Priority Data

Feb. 2, 2024 (JP) ................................. 2024-015222

(51) Int. Cl.
*G06F 16/90* (2019.01)
*G06F 16/9538* (2019.01)

(52) U.S. Cl.
CPC ................................ *G06F 16/9538* (2019.01)

(58) Field of Classification Search
CPC .................................................. G06F 16/9538
See application file for complete search history.

(56) References Cited

U.S. PATENT DOCUMENTS

2014/0059695 A1* 2/2014 Parecki ................. H04W 12/08
726/26
2019/0050645 A1* 2/2019 Hentz .................... G06V 20/20

FOREIGN PATENT DOCUMENTS

JP 2005-339101 A 12/2005

OTHER PUBLICATIONS

Li et al., Fine-grained location extraction from tweets with temporal awareness. 2014 [retrieved May 30, 2025]. In Proceedings of the 37th international ACM SIGIR conf. on Research & development in information retrieval (SIGIR '14). Retrieved from the Internet: https://doi.org/10.1145/2600428.2609582 (Year: 2014).*

* cited by examiner

Primary Examiner — Kristopher Andersen
(74) Attorney, Agent, or Firm — SoraIP, Inc.

(57) ABSTRACT

An information processing device is an information processing device that acquires information from social media. The information processing device includes a control unit configured to: acquire at least one posted text from social media; extract at least one facility name from the posted text; select, as a candidate point, one or more points whose evaluation value determined by a predetermined criterion is equal to or larger than a first threshold from one or more points corresponding to the extracted facility name; and display, on a map, information indicating a location of the candidate point selected by the user.

12 Claims, 3 Drawing Sheets

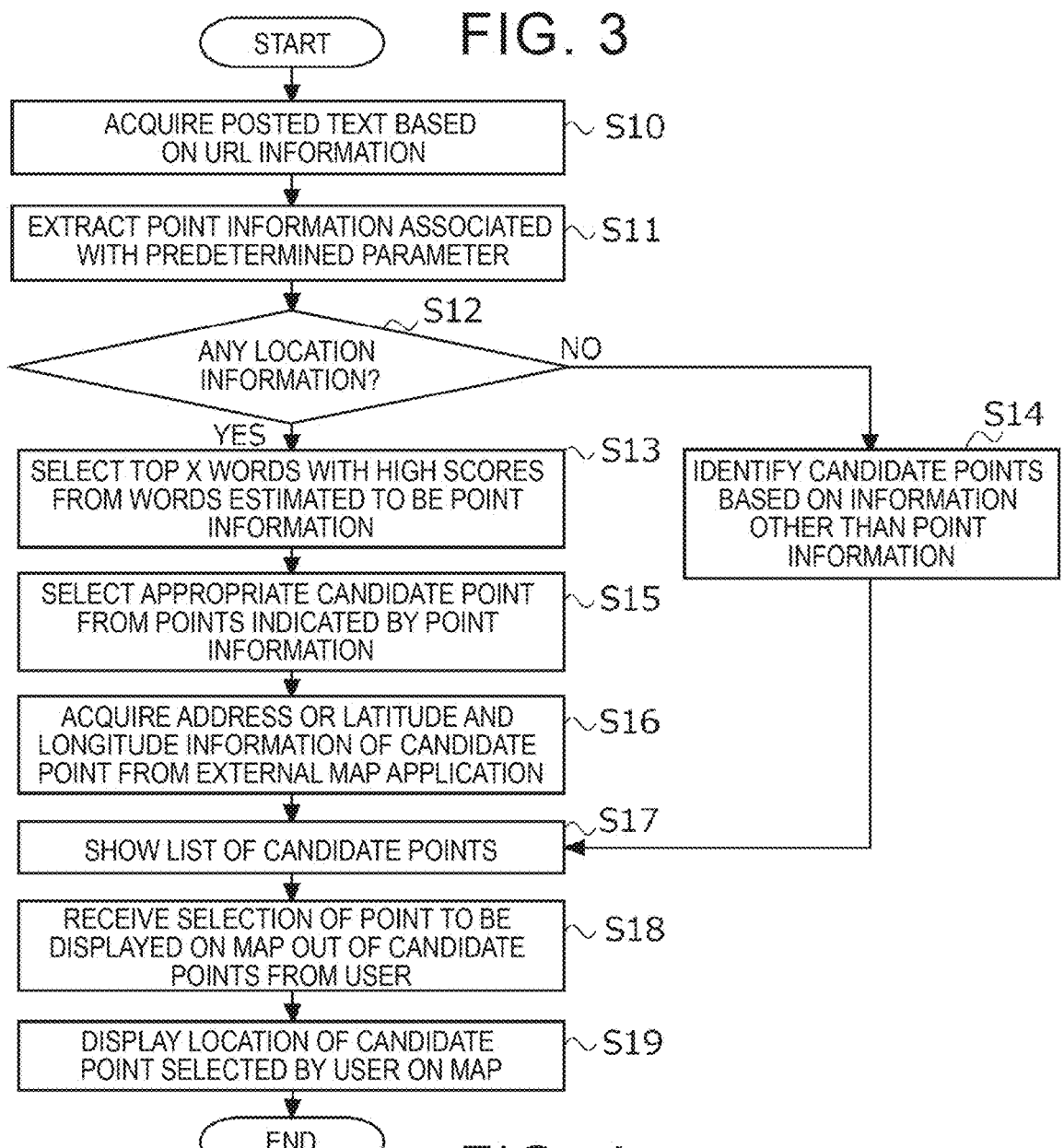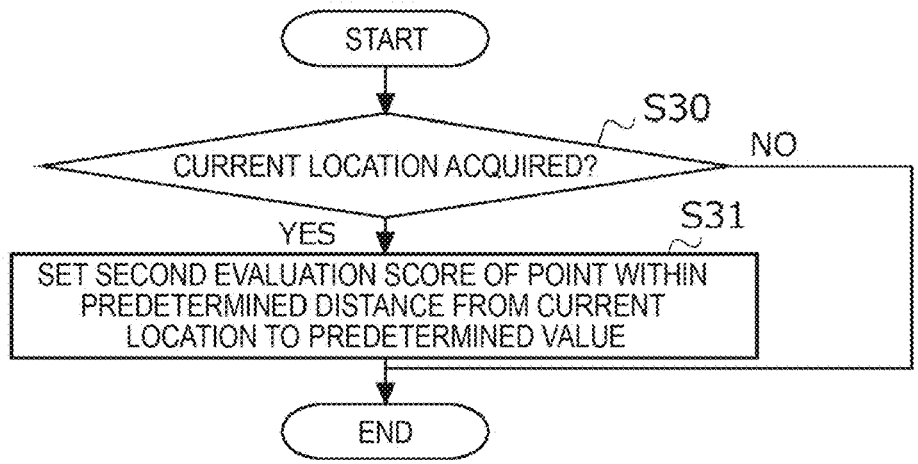

INFORMATION PROCESSING DEVICE AND INFORMATION PROCESSING METHOD

CROSS-REFERENCE TO RELATED APPLICATION

This application claims priority to Japanese Patent Application No. 2024-015222 filed on Feb. 2, 2024, incorporated herein by reference in its entirety.

BACKGROUND

1. Technical Field

The present disclosure relates to devices that display location information based on information acquired from text.

2. Description of Related Art

A technique of extracting or collecting information including location information from a predetermined server device is known in the art. In this regard, for example, Japanese Unexamined Patent Application Publication No. 2005-339101 (JP 2005-339101 A) discloses a point information retrieval server including a point information extraction unit for extracting point information associated with a registered keyword that matches a search keyword.

SUMMARY

An object of the present disclosure is to identify location information from words contained in text and display the location information.

One aspect of an embodiment of the present disclosure is an information processing device that acquires information from social media. The information processing device includes a control unit configured to acquire at least one posted text from the social media, extract at least one facility name from the posted text, select, as a candidate point, one or more points whose evaluation value determined by a predetermined criterion is equal to or larger than a first threshold from one or more points corresponding to the extracted facility name, and display, on a map, information indicating a location of the candidate point selected by a user.

Another aspect of the embodiment of the present disclosure is an information processing method of acquiring information from social media. The information processing method includes: acquiring at least one posted text from the social media; extracting at least one facility name from the posted text; selecting, as a candidate point, one or more points whose evaluation value determined by a predetermined criterion is equal to or larger than a first threshold from one or more points corresponding to the extracted facility name; and displaying, on a map, information indicating a location of the candidate point selected by a user.

Other aspects include a method that is performed by the device, a program for causing a computer to perform the method, and a computer-readable storage medium that stores the program in a non-transitory manner.

According to the present disclosure, it is possible to identify location information from words contained in text and display the location information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flow chart of a process executed by a control unit of the server device according to the embodiment; and FIG. 4 is a flowchart of a process of selecting a candidate point based on a current location executed by a control unit of the server device according to the embodiment.

DETAILED DESCRIPTION OF EMBODIMENTS

Overview

Figure 1:
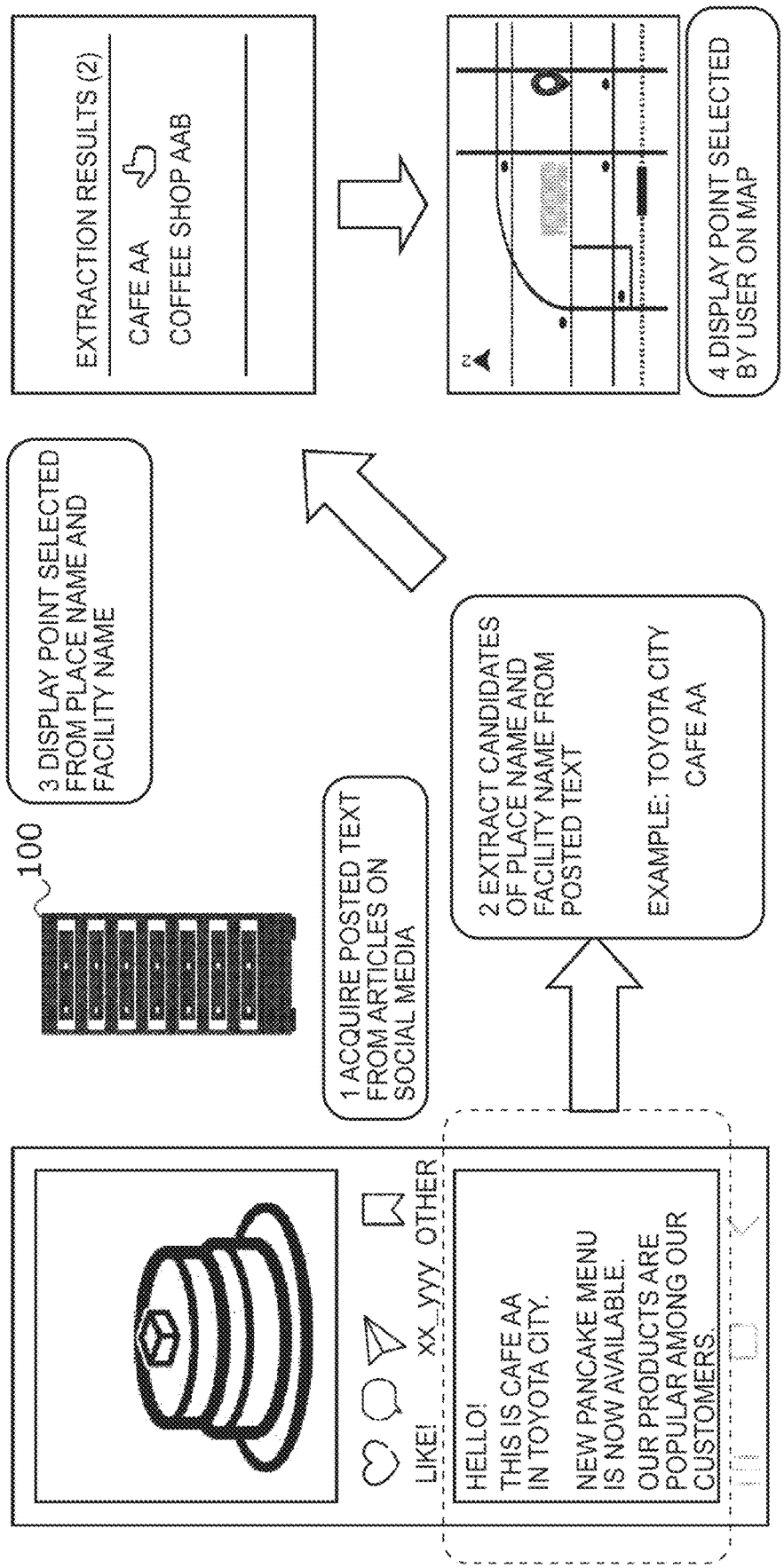
FIG. 1 is a diagram illustrating an outline of processing executed by a server device according to an embodiment.

A technique of acquiring location information corresponding to a keyword registered in advance using a predetermined keyword may be used.

However, in the related art, it is difficult to acquire the location information when the information to be analyzed does not include the same word as the predetermined keyword. As described above, in the related art, it is assumed that location information is acquired with respect to data prepared in advance, and it is difficult to acquire location information from irregular data which is not prepared under a certain standard. For example, when a user wants to know the location of a facility described in an article posted on social media etc., the location of the facility described in the article being browsed needs to be searched separately using a search engine. Therefore, it is desirable for the information processing device to be able to acquire the location information included in the content of the article on social media to display the location corresponding to the location information without being searched by the user.

An information processing device according to an aspect of the present disclosure is an information processing device that acquires information from social media. The information processing device includes a control unit configured to acquire at least one posted text from social media, extract at least one facility name from the posted text, select, as a candidate point, one or more points whose evaluation value determined by a predetermined criterion is equal to or larger than a first threshold from one or more points corresponding to the extracted facility name, and display information indicating a location of the candidate point selected by the user on a map.

The posted text is text data that can be acquired on a web service such as social media. Typically, the posted text includes, in the form of text data, one or more predetermined facility names, one or more place names, or the like.

The point corresponding to the facility name is a point associated with the facility name out of information such as the Internet or information stored in a predetermined server device or the like.

The evaluation value is a value indicating an evaluation score obtained by evaluating each point corresponding to the facility name by a predetermined criterion. As the evaluation value, for example, a higher value may be set as the degree of match between the text data of the web page obtained by searching the extracted facility name using the search engine of the external web page and the text data of the acquired posted text on the social media is higher.

The control unit extracts the facility name from the posted text on social media, and specifies a candidate point corresponding to the facility name. Then, the control unit displays the location of the candidate point selected by the user from among the plurality of candidate points on the map.

For example, the control unit analyzes an article related to a predetermined store posted on social media, extracts a name of the predetermined store, and acquires, from another Internet service, information indicating a point corresponding to the name of the store. Then, the control unit displays the location of the point on the map.

Thus, the information processing device according to the present disclosure can specify and display location information from words included in text. That is, the information processing device according to the present disclosure can improve convenience of a user who collects information using various types of text data.

The evaluation value may include a first evaluation score indicating a degree of match between text data obtained from a result of web search of a target point to be evaluated and text data of the posted text, and a second evaluation score indicating proximity of the target point from the user. The control unit may acquire a current location of the user, and set the second evaluation score of a point located within a predetermined distance from the current location out of one or more points corresponding to the extracted facility name to a predetermined value.

As a result, the information processing device according to the present disclosure can provide information on a point that is more likely to be sought by the user by increasing an evaluation value of a point close to the current location of the user to be a candidate point.

The control unit may further extract at least one place name from the posted text. The control unit may select, as the candidate point, one or more points corresponding to the extracted place name out of one or more places corresponding to the extracted facility name and whose evaluation value determined by the predetermined criterion is equal to or larger than a predetermined value.

Thus, the information processing device according to the present disclosure can specify the location information by using not only the facility name but also the place name included in the text.

In addition, the control unit may receive a selection of the user regarding whether to acquire the current location on the screen.

Thus, the information processing device according to the present disclosure can enable the user to select whether or not to evaluate a point using the current location.

Further, the information processing method according to the present disclosure is an information processing method of acquiring information from social media. The information processing method includes a step of acquiring at least one posted text from social media, a step of extracting at least one facility name from the posted text, a step of selecting, as a candidate point, one or more points of one or more points corresponding to the extracted facility name, the one or more points whose evaluation value determined by a predetermined criterion is equal to or larger than a first threshold, and a step of displaying, on a map, information indicating a location of the candidate point selected by the user.

Thus, the information processing method according to the present disclosure can achieve the same effects as those of the information processing device described above.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

Embodiment

Overview of Processing of Server Device

An outline of processing performed by the server device according to the embodiment will be described with reference to FIG. 1. FIG. 1 is a diagram illustrating an outline of processing executed by the server device 100 according to the embodiment. Here, the server device 100 is an example of an information processing device according to the present disclosure. The server device 100 acquires the text data of the posted text from social media, and displays information indicating a place corresponding to the facility name or the place name included in the posted text on the map. The server device 100 is typically implemented as a server device for providing Web application services. The server device 100 may be realized by a plurality of server devices, cloud servers, or the like.

First, the server-device 100 acquires a posted text from an article on social media. The server device 100 may acquire text data of an article viewed by the user. For example, as shown in FIG. 1, "Hello! This is a cafe AA in Toyota City. A new hotcake menu is now available. It has been well received by everyone." The textual data is retrieved from the story on social media.

Next, the server device 100 extracts candidates for a place name and a facility name from the posted text. The server device 100 extracts a word that is considered to be a place name and a facility name from the text data of the posted text, and sets the word as a candidate for each of the place name and the facility name. For example, as illustrated in FIG. 1, the server device 100 extracts the word "Toyota City" and the word "cafe AA" from the text of the posted text as candidates for the place name and the facility name, respectively.

Subsequently, the server device 100 selects the corresponding point from among the plurality of points based on the place name and the facility name extracted as the candidate. A plurality of points corresponding to the extracted place names and facility names may be selected. Then, the server device 100 displays the selected point on the screen in a list format. For example, as illustrated in FIG. 1, the server device 100 displays "cafe AA" and "coffee shop AAB" which are two search results corresponding to the words "Toyota City" and "cafe AA". The search results may be obtained using an external search engine.

Next, the server device 100 receives, from the user, a selection of one or more of the points selected by the server device 100. That is, the server device 100 allows the user to select a desired point from one or more points displayed in a list format. Then, the server device 100 displays the location of the point selected by the user on the map.

As described above, in the present embodiment, the server device 100 is configured to acquire the text data of the posted text from social media, select a point corresponding to the facility name or the place name included in the posted text, and map-display the point selected by the user from the point. Note that a plurality of facility names or place names included in the posted text may be extracted, or a plurality of points corresponding to the facility names or place names may be selected. With such a configuration, the server device 100 can specify and display the location information from the words included in the text.

Configuration of Server Device

Figure 2:
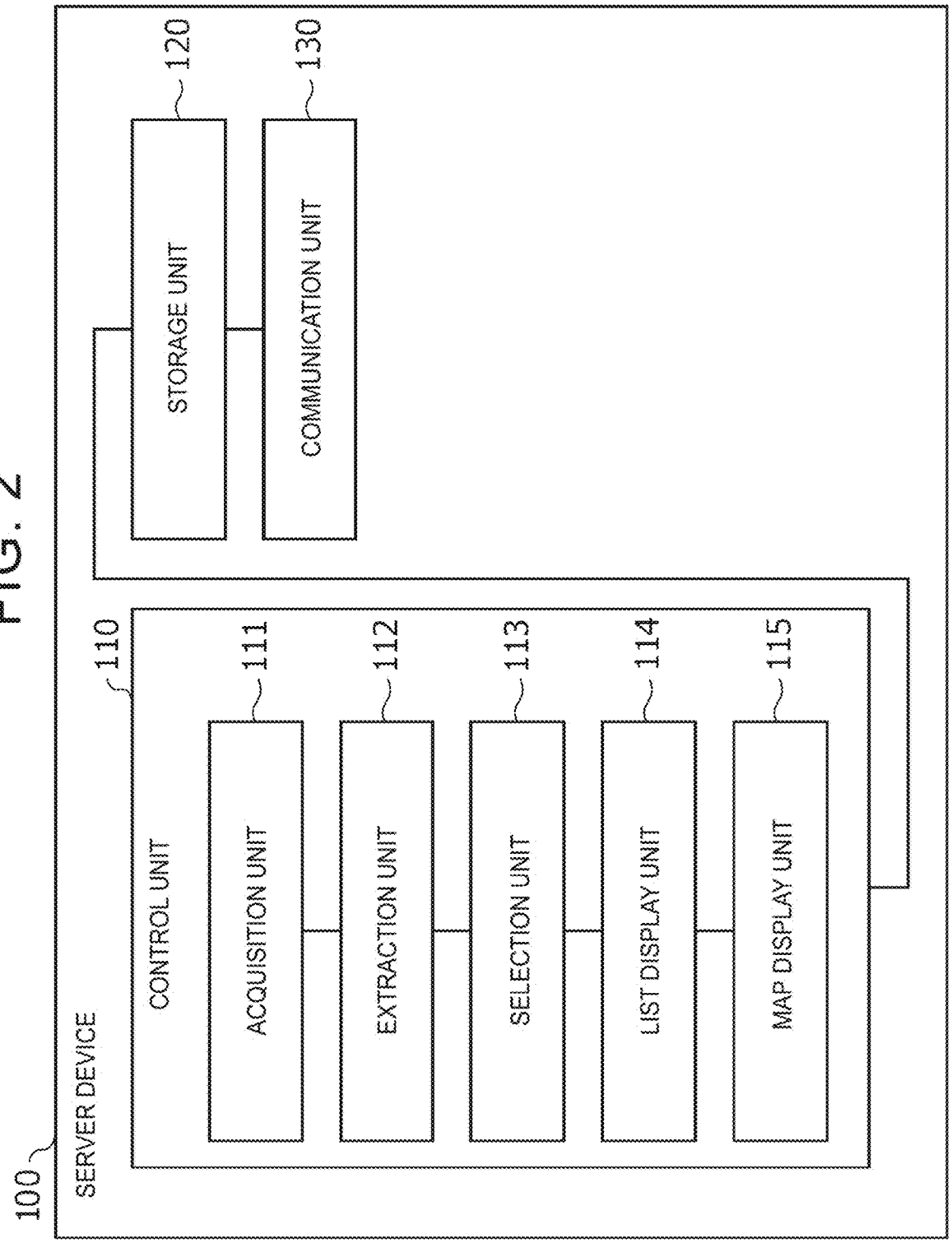
FIG. 2 is a diagram illustrating components included in the server device according to the embodiment.

FIG. 2 is a diagram illustrating components of the server device 100 according to the embodiment. In FIG. 2, the server device 100 may be implemented by one or more computers.

The server device 100 according to the present embodiment includes a control unit 110, a storage unit 120, and a communication unit 130. The server device 100 is a server device that executes an application service that provides a map for displaying a location of a predetermined facility to a user. The server device 100 may be implemented by a cloud server.

The control unit 110 is implemented by a processor such as a Central Processing Unit (CPU) or a Graphics Processing Unit (GPU) and a memory. The control unit 110 includes an acquisition unit 111, an extraction unit 112, a selection unit 113, a list display unit 114, and a map display unit 115 as functional modules. These functional modules may be realized by executing a program by the control unit 110.

The acquisition unit 111 acquires at least one posted text from website of social media. The acquisition unit 111 communicates with an external server device or the like that provides social media via the communication unit 130, and acquires the text data of the posted text.

The extraction unit 112 extracts at least one facility name from the posted texts acquired by the acquisition unit 111. The extraction unit 112 analyzes the text data of the posted text to identify at least one facility name. For example, the extraction unit 112 may extract the name of a facility registered in advance by using a text analysis technique such as text mining, or may extract the facility name by using a generation AI or the like.

The selection unit 113 selects one or more points corresponding to the facility name extracted by the extraction unit 112 as candidate points. The selection unit 113 sets a point at which the evaluation value determined by a predetermined criterion is equal to or larger than a predetermined value as a candidate point. Here, the candidate point is a point indicating a candidate that is a facility represented in the acquired posted text.

The list display unit 114 displays one or more candidate points selected by the selection unit 113 on the screen. The list display unit 114 displays candidate points in a list format.

The map display unit 115 displays the location of one candidate point selected by the user on the screen superimposed on the map. The map display unit 115 may display the location of the candidate point selected by the user from the list of candidate points displayed by the list display unit 114 by superimposing the location on the map using pins, icons, or the like.

The storage unit 120 is an auxiliary storage device such as a main storage device such as a RAM or a ROM, a EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data or the like used or generated in processing performed by the control unit 110. Further, the storage unit 120 may store map data and the like.

The communication unit 130 includes a communication circuit that performs wireless communication. The communication unit 130 may be, for example, a communication circuit that performs wireless communication using 4th Generation (4G) or a communication circuit that performs wireless communication using 5th Generation (5G). The communication unit 130 may be a communication circuit that performs radio communication using Long Term Evolution (LTE), or may be a communication circuit that performs communication using Low Power Wide Area (LPWA). Further, the communication unit 130 may be a communication circuit that performs radio communication using Wi-Fi (registered trademark).

Operation of Server Device

Next, specific contents of the processing performed by the server device 100 will be described. FIG. 3 is a flowchart of processing executed by a control unit of the server device according to the embodiment.

When the user is browsing a social media webpage and performs a particular action, the server device 100 starts S10 process. For example, when the user is browsing social media through a predetermined application, the specific manipulation may be pressing a specific button in the application. Alternatively, when the user is browsing social media via the server device 100, S10 process may be automatically started after a predetermined period of time has elapsed since the user started browsing webpage. When the user performs a specific operation on social media application while social media is being browsed in the terminal associated with the user, the terminal associated with the user transmits, to the server device 100, information for identifying the page of social media being browsed, and the like. The specific operation is, for example, pressing a sharing button. The information is, for example, URL information.

First, in S10, the acquisition unit 111 acquires a posted text based on Uniform Resource Locator (URL) transmitted by the terminal associated with the user to the server device 100. The acquisition unit 111 acquires the text data of the posted text from the address indicated by URL information of the page on social media viewed by the user or designated by the user. Note that the web page on which the acquisition unit 111 acquires the posted text is not limited to social media. The acquisition unit 111 may acquire text data from an arbitrary web service.

Subsequently, in S11, the extraction unit 112 extracts the point data associated with the predetermined parameter. Here, the point information may be a name, a place name, or the like of a predetermined facility included in the text data. The predetermined parameter may be a tag indicating that the associated text data indicates a facility name, a place name, location information, or the like. For example, some social media services may be tagged with words corresponding to geographic names or facility names. For example, the extraction unit 112 extracts text data (typically, words) associated with a predetermined tag. The extraction unit 112 may extract only the facility name as the point information, or may extract the place name and the like together with the facility name. For example, the extraction unit 112 may use a function such as an Amazon Comprehend.

Next, in S12, the selection unit 113 determines whether or not the acquired text data of the posted text includes the point information. When the selection unit 113 determines that the point information is included in the text data of the acquired posted text, the determination in this step is affirmative.

If an affirmative determination is made in this step, the process transitions to S13.

If a negative determination is made in this step, the process transitions to S14.

When the process transitions to S13, the selection unit 113 selects, from the top, a predetermined number of words having a higher predetermined score among the words estimated as the point information. Here, the predetermined score may be a value indicating a degree to which a word estimated as the point information matches a word (for example, a place name) registered in advance.

Subsequently, in S15, the selection unit 113 selects an appropriate candidate point from the point indicated by the point information. The selection unit 113 sets, as a candidate point, one or more points corresponding to the facility name extracted by the extraction unit 112, at which the evaluation value determined by a predetermined criterion is equal to or larger than the first threshold.

For example, the selection unit 113 searches for the extracted facility name using a search engine of an external web page, and analyzes text data of the web page indicated as a search result. Then, the selection unit 113 analyzes the degree of match between the analysis result of the text data of the searched web page and the analysis result of the text data of the posted text. Here, the degree of match may or may not be simply a match of a word, a sentence, or the like. The degree of match may indicate a height of a possibility that a facility derived from the text data of the searched web page and a facility derived from the text data of the posted text are the same facility.

Then, the selection unit 113 evaluates each of the points indicated by the plurality of searched web pages or the like using an evaluation value determined by a predetermined criterion. The evaluation value may be, for example, a value indicating the level of the degree of match. Further, for example, in a case where there is a plurality of pieces of information indicating points corresponding to the facility name, the evaluation value may be set so that the evaluation result of the point where the most frequent result is displayed among the search results of the points corresponding to the facility name is highest. When there is a plurality of candidate points, the selection unit 113 may rank the plurality of candidate points based on the evaluation values of the respective candidate points.

Next, in S16, the selection unit 113 acquires, from the external mapping application, information regarding an address or latitude and longitude corresponding to the candidate point. The selection unit 113 inputs the point information of the candidate point and the estimated word to the external map application, and acquires information on the corresponding address or latitude and longitude. For example, the selection unit 113 may use a pre-existing function such as a Google Maps Platform. Alternatively, the selection unit 113 may self-hold the map data, and may self-identify information regarding an address or latitude and longitude corresponding to the candidate point.

When the process transitions to S14, the selection unit 113 identifies the candidate points on the basis of the point information that is not associated with the predetermined parameter. For example, the selection unit 113 extracts, from the acquired text data of the posted text, a word (phrase) that is not associated with a predetermined parameter but is presumed to be point information. Then, the selection unit 113 selects a predetermined number of pieces of extracted point information having a high predetermined score from the top. Subsequently, the selection unit 113 sets, as a candidate point, a point of one or more points corresponding to the point information selected by the selection unit 113, the evaluation value determined by a predetermined criterion being equal to or larger than a predetermined value. Then, the selection unit 113 evaluates the candidate points in the same manner as in S15, and acquires, from an external mapping application, information regarding an address or latitude and longitude corresponding to the candidate points in the same manner as in S16.

Next, after S14 or S16, the list display unit 114 displays a list of candidate points selected by the selection unit 113 in S17. The list display unit 114 displays one candidate point or a list of a plurality of candidate points on the screen. The list display unit 114 may display a list of candidate points on the basis of the rank order between a plurality of candidate points determined based on the evaluation values of the candidate points.

Next, in S18, the list-display unit 114 receives, from the user, a selection of a point to be displayed on the map among the candidate points. For example, the list display unit 114 receives a candidate point that the user has tapped, clicked, or the like on the screen on which the list of candidate points is displayed.

Subsequently, in S19, the map display unit 115 displays the candidate points selected by the user on the map. The map display unit 115 displays the location of the selected candidate point on the map. In addition to the location of the selected candidate point, the map display unit 115 may also display information such as a facility name, an address, a telephone number, or a menu in the restaurant of the candidate point.

Thus, in the present embodiment, the server device 100 can indicate, on a map, a location corresponding to a place name, a facility name, or the like included in a posted text obtained from social media or the like. That is, the server device 100 can specify and display the location information from the words included in the text. Therefore, the server device 100 can reduce the effort of the user to independently search for the place name or the facility name posted on social media or the like.

In-Vehicle Terminal

Note that the process of S19 from S10 may be executed by the in-vehicle terminal instead of the server device 100. The in-vehicle terminal may acquire text-data of a posted text from social media or the like browsed by the in-vehicle terminal or a terminal associated with the user by the user of the vehicle on which the in-vehicle terminal is mounted. The in-vehicle terminal may indicate, on a map, a location corresponding to a place name, a facility name, or the like included in the posted text on a screen included in the in-vehicle terminal.

Modification of First Embodiment

Displaying Candidate Points Based on Current Location

In the first embodiment, the server device 100 specifies a corresponding location from a place name, a facility name, or the like included in the posted text acquired from social media etc., and displays the location on the map. However, if the place specified by the place name or the facility name included in the posted text is too far from the current location of the user, it may not be said that the place is providing useful information for the user. For example, it may be more effective for a user in Tokyo to display a candidate point in the suburbs of Tokyo than for displaying a candidate point in Kyushu among candidate points corresponding to a place name or a facility name included in a posted text. Therefore, in the modification of the first embodiment, the server device 100 sets the evaluation value so that a point within a predetermined distance from the current location of the user is easily selected as the candidate point.

FIG. 4 is a flowchart of a process of selecting a candidate point based on the current location executed by the control unit 110 of the server device 100 according to the embodiment. The process illustrated in FIG. 4 is executed after S14 process and prior to S15 process. In a variant of the first embodiment, the evaluation value comprises a first evaluation score and a second evaluation score. The first evaluation score indicates the degree of match between the text data obtained from the search result of the target point, which is the point to be evaluated, and the text data of the obtained posted text. The second evaluation score indicates the proximity of the target point, which is the point to be evaluated, from the current location.

First, in S30, the selection unit 113 determines whether the current location of the user has been acquired. For example, the selection unit 113 may determine whether the user has acquired the current location of the terminal used for browsing social media or the like. In addition, the selection unit 113 may receive, on the screen, a user's selection regarding whether the selection unit 113 acquires the current location of the user. For example, the selection unit 113 may display, on the screen, a button for selecting whether or not to use the current location of the user for processing executed by the control unit 110, and accept the user's selection. When the selection unit 113 determines that the current location of the user has been acquired, the determination in this step is affirmative.

If an affirmative determination is made in this step, the process transitions to S31.

If a negative determination is made in this step, the process ends.

When the process transitions to S31, the selection unit 113 sets the second evaluation score at a point within a predetermined distance from the current location of the user to a predetermined value or more. For example, the selection unit 113 may uniformly set the second evaluation score at a point within a predetermined distance from the current location of the user to a reference value or more. Further, for example, the selection unit 113 may set a value inversely proportional to the distance from the current location of the user as the second evaluation score. Further, the selection unit 113 sums the separately set first evaluation scores and the second evaluation scores set by S31 to determine the evaluation values of the candidate points. When the first evaluation score is separately set, the first evaluation score may be set higher as the degree of match between the text data obtained from the search result of the target point which is the point to be evaluated and the text data of the acquired posted text is higher.

Note that the process of S31 from S30 may be further executed by the in-vehicle terminal that executes S19 from S10.

As a result, in the modification of the first embodiment, the server device 100 can preferentially present the user with a point within a predetermined distance from the current location of the user, among the points corresponding to the place name or the facility name included in the posted text on social media. Therefore, the server device 100 can further enhance the convenience of the user.

Other Embodiments

The above-described embodiment is merely an example, and the present disclosure may be appropriately modified and implemented without departing from the scope thereof.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device that acquires information from social media, the information processing device comprising a processor configured to
receive a Uniform Resource Locator (URL) address of a post published on the social media from a user,
acquire text of the post from the URL address,
extract at least a facility name from the text of the post,
search for a plurality of websites with the facility name using an external search engine,
acquire text of the websites obtained from the search,
compare the text of the websites and the text of the post published on the social media,
set first evaluation scores based on the comparing of the text of the websites and the text of the post, each of the first evaluation scores indicating a degree of match between the text of a corresponding one of the websites and the text of the post published on the social media,
set evaluation values of points corresponding to the facility name, the evaluation values including at least the first evaluation scores, each of the points being derived from a corresponding one of the text of the websites,
select points among the points whose the evaluation values are equal to or larger than a first threshold as candidate points corresponding to the extracted facility name,
acquire information on locations of the candidate points from an external mapping application,
display a list of the candidate points,
receive a selection of one candidate point among the candidate points from the user, and
display the location of the candidate point selected by the user on a map.

2. The information processing device according to claim 1, wherein
each of the evaluation values further includes a second evaluation score, the second evaluation score indicating proximity of a corresponding one of the points from the user, and
the processor is further configured to
acquire a current location of the user,
acquire locations of the points, and
set the second evaluation score of a point among the points located within a predetermined distance from the current location to a predetermined value.

3. The information processing device according to claim 2, wherein
the processor is further configured to receive, on a screen, selection of the user as to whether to acquire the current location.

4. The information processing device according to claim 1, wherein
the processor is further configured to extract at least one place name from the text of the post, and select points among the points that correspond to the extracted place name and whose the evaluation values are equal to or larger than a predetermined value as the candidate points from the one or more points corresponding to the extracted facility name.

5. The information processing device according to claim 1, wherein the processor is further configured to extract text associated with a predetermined tag corresponding to a geographic name or the facility name from the post published on the social media.

6. The information processing device according to claim 1, wherein the processor is further configured to select a predetermined number of words as point information, the words having scores higher than a predetermined score, the predetermined score being a value indicating a degree to which a word estimated as the point information matches a pre-registered word, and search for a plurality of websites with the point information using an external search engine.

7. The information processing device according to claim 1, wherein the information on the locations of the candidate points includes an address or, a latitude and longitude.

8. The information processing device according to claim 1, wherein the candidate points are displayed on the list of the candidate points in an order based on the evaluation values of the candidate points.

9. The information processing device according to claim 1, wherein a telephone number or an address is displayed on the map.

10. The information processing device according to claim 1, wherein the candidate point selected by the user is a restaurant and a menu is displayed on the map.

11. An information processing method of acquiring information from social media, the information processing method executed by a processor comprising:

receiving a Uniform Resource Locator (URL) address of a post published on the social media from a user;

acquiring text of the post from the URL address;

extracting at least a facility name from the text of the post;

searching for a plurality of websites with the facility name using an external search engine;

acquiring text of the websites obtained from the search;

comparing the text of the websites and the text of the post published on the social media;

setting first evaluation scores based on the comparing of the text of the websites and the text of the post, each of the first evaluation scores indicating a degree of match between the text of a corresponding one of the websites and the text of the post published on the social media;

setting evaluation values of points corresponding to the facility name, the evaluation values including at least the first evaluation scores, each of the points being derived from a corresponding one of the text of the websites;

selecting points among the points whose the evaluation values are equal to or larger than a first threshold as candidate corresponding to the extracted facility name;

acquiring information on locations of the candidate points from an external mapping application;

displaying a list of the candidate points;

receiving a selection of one candidate point among the candidate points from the user; and displaying the location of the candidate point selected by the user on a map.

12. A system providing location information based on a post published on social media comprising a server device, a user terminal, and an in-vehicle terminal in a vehicle, wherein the user terminal is configured to send a Uniform Resource Locator (URL) address of the post published on the social media to the server device, the server device comprises a processor configured to:

acquire text of the post from the URL address upon receipt of the URL address;

extract at least a facility name from the text of the post;

search for a plurality of websites with the facility name using an external search engine;

acquire text of the websites obtained from the search;

compare the text of the websites and the text of the post published on the social media;

set first evaluation scores based on the comparing of the text of the websites and the text of the post, each of the first evaluation scores indicating a degree of match between the text of a corresponding one of the websites and the text of the post published on the social media;

set evaluation values of points corresponding to the facility name, the evaluation values including at least the first evaluation scores, each of the points being derived from a corresponding one of the text of the websites;

select points among the points whose the evaluation values are equal to or larger than a first threshold as candidate points corresponding to the extracted facility name;

acquire information on locations of the candidate points from an external mapping application;

display a list of the candidate points; and receive a selection of one candidate point among the candidate points from a user, and the in-vehicle terminal is configured to display the location of the candidate point selected by the user on a map.

* * * * *